United States Patent [19] — [11] 4,022,632
Newland et al. [45] May 10, 1977

[54] DECREASING THE PHOTOSENSITIVITY OF TITANIUM IV DIOXIDE

[75] Inventors: Gordon C. Newland; Gether Irick, Jr.; Thomas H. Larkins, Jr., all of Kingsport, Tenn.

[73] Assignee: Eastman Kodak Company, Rochester, N.Y.

[22] Filed: July 2, 1976

[21] Appl. No.: 702,162

[52] U.S. Cl. .............................. 106/193 J; 106/300; 106/308 F
[51] Int. Cl.$^2$ ........................ C08L 1/12; C09C 1/36
[58] Field of Search ............. 106/300, 308 F, 193 J

[56] References Cited

UNITED STATES PATENTS

| | | | |
|---|---|---|---|
| 2,067,060 | 1/1937 | Minor | 106/308 F |
| 2,990,291 | 6/1961 | Bartholomay | 106/193 J |
| 3,266,923 | 8/1966 | Morway et al. | 106/308 F |

Primary Examiner—Winston A. Douglas
Assistant Examiner—J. V. Howard
Attorney, Agent, or Firm—Donald W. Spurrell; Daniel B. Reece, III

[57] ABSTRACT

Disclosed are $TiO_2$ pigments treated to decrease their photosensitizing propensity and their tendency to degrade polymeric materials. Commercial $TiO_2$ pigments, both anatase and rutile, treated according to the present invention with manganous, cobaltous or cerous salts, particularly acetate, are effectively desensitized.

5 Claims, No Drawings

DECREASING THE PHOTOSENSITIVITY OF TITANIUM IV DIOXIDE

This invention concerns a process for treating $TiO_2$ pigments to reduce their sensitizing effect, on for example, the photostability of synthetic fibers such as cellulose acetate, polyesters and polyolefins. The utility of $TiO_2$ as a pigment is of course universally recognized in the fields of surface coatings, plastics, paints and fibers. Not so well advertised however, to the layman, is its extensive use as a catalyst in a wide variety of reactions such as the oxidation of cumene to phenol and acetone. Incident to its ability to catalyze reactions is its tendency in the presence of sunlight to catalyze degradation of the polymer which it is pigmenting, resulting in premature failure of the product in such properties as elongation and the like.

Objectives of this invention include the development of a process for treating $TiO_2$ to reduce its ability to sensitize the photodegradation of polymers, and to produce sunlight-resistant cellulose acetate yarn.

These and other objects hereinafter appearing have been attained in accordance with the present invention through the discovery that treating $TiO_2$ pigments with water solutions of manganous, cobaltous, or cerous salts, especially acetate, wherein evaporation of the water leaves the pigment coated with the salt, greatly reduces the photosensitizing properties of $TiO_2$. Incorporating the treated $TiO_2$ pigment into polymeric materials particularly cellulose acetate yarn markedly diminishes the photodegradation normally anticipated. In contrast, the use of oxides of such metal gives greatly inferior results.

The useful salts have the formula $(R-CO_2)_2Me$ where Me is $Ce^{+2}$, $Mn^{+2}$ or $Co^{+2}$ and R is a linear or branched alkyl group having from 1 to 12 carbons, preferably 1 to 3 carbons. Such alkyl groups are, for example, methyl, ethyl, n-propyl, isopropyl, n-butyl, sec-butyl, isobutyl, and the like.

The process for treating the $TiO_2$ is generally that of coating the pigment with the salt dissolved in water, although organic solvents can be used as shown in Table I. The important factor is that the solvent must wet $TiO_2$ and be removable. The useful concentration range of the manganese, cobalt or cerium in the actual coating on the $TiO_2$ is from about 0.1% to 20.0% by weight, based on the weight of the $TiO_2$, with from about 1.0% to about 10.0% being preferred.

$TiO_2$ pigments treated as herein described can be used in polymers wherever outdoor weatherability is desired. Examples of uses are in yarn and synthetic fibers usually at concentrations of from about 0.01 to about 5.0% by weight, molding compositions of high polymers, paints, powder coatings and wire coatings. The polymer is not restricted to cellulose acetate but includes polyesters, polyamides, polyolefins, ABS, poly(vinyl alcohol), poly(vinyl chloride), polyacrylonitrile and modacrylic compositions, polycarbonates, regenerated cellulose and the like.

EXAMPLE 1

Baker, reagent grade, anatase $TiO_2$ was treated by preparing a slurry of the pigment with a water solution of various acetic acid salts. The water was evaporated on a steam bath to leave a dry $TiO_2$ coated with approximately 3% by weight of the salt. Tests for photosensitivity were conducted by mixing 2 g. of the pigment with 8 ml. isopropanol in a 16 × 150-mm. culture tube. The tube was flushed with oxygen, capped with a Teflon-lined screw cap and exposed to light from a 1,000-watt mercury arc. During the irradiation period the tubes were agitated to keep the pigment in suspension. Control samples containing no $TiO_2$ and untreated $TiO_2$ was also tested. After a period of irradiation, lasting from 5–200 hr., the tubes were removed, the isopropanol clarified by centrifuging, and analyzed for acetone by gas chromatography; acetone is the oxidation product of isopropanol. It was established that no acetone was formed by light in the absence of $TiO_2$.

The results of the tests, summarized in Table 1 indicate that while several salts tend to reduce the photosensitivity of $TiO_2$, manganese, cobalt and cerium acetate are outstanding in their effectiveness.

EXAMPLE 2

In another series of tests, the effect of the salts in terms of metal concentration, on the desensitization of rutile and anatase $TiO_2$ was determined by the process described in Example 1 employing salt concentrations to give the desired metal content in the coatings. The results, summarized in Table 2, show the effect of the metals over the range of 0.1 to 10% by weight of the metal.

EXAMPLE 3

The effect of cerous acetate on the desensitization of $TiO_2$ was compared with that of zinc diethylphosphate. The procedure described in Example 1 was used. The results, summarized in Table 3, indicate that cerous acetate is quite superior to zinc diethylphosphate in desensitizing the $TiO_2$ pigments Unitane OR-650 and Unitane OR-450.

EXAMPLE 4

The effects of cerous acetate and zinc diethylphosphate on the desensitization of Degussa P-25 $TiO_2$ were compared by the procedure described in Example 1. The results, shown in Table 4, indicate that cerous acetate is an effective desensitizer for Degussa P-25 pigment.

EXAMPLE 5

Pigments treated with cerous acetate were incorporated at the indicated concentrations in cellulose acetate fiber by admixing the treated pigment with an acetone dope of cellulose acetate and spinning fibers in a commercial spinning cabinet. The fibers thus produced were exposed to 3100A irradiation from a fluorescent lamp and the physical properties of the fibers measured versus irradiation time. The results, shown in Table 5, show that the yarn compositions containing cerous acetate treated $TiO_2$ were more stable to ultraviolet light than those containing untreated $TiO_2$ or no $TiO_2$.

Table 1

Photoactivity of Anatase (Baker) $TiO_2$ Coated With Metal Acetates

| Acetate Salt Coating of 3% by Wt. Concentratio on the $TiO_2$ | *$\Phi$rel. |
|---|---|
| None | 1.0 |
| Manganous | <.0009 |
| Cobaltous | .01 |
| Cerous | .017 |
| Calcium | .18 |
| Nickel | .21 |
| Didymium | .21 |
| Stannous | .21 |

Table 1-continued

Photoactivity of Anatase (Baker) TiO$_2$ Coated With Metal Acetates

| Acetate Salt Coating of 3% by Wt. Concentratio on the TiO$_2$ | *Φrel. |
|---|---|
| Chromic | .21 |
| Sodium | .25 |
| Yttrium | .28 |
| Barium | .29 |
| Magnesium | .30 |
| Neodymium | .32 |
| Cupric | .32 |
| Niobium | .34 |
| Samarium | .35 |
| Potassium | .39 |
| Uranyl | .42 |
| Aluminum | .46 |
| Strontium | .49 |
| Lead | .57 |
| Ferric | .64 |
| Gallium | .85 |
| Thallium | .89 |
| Silver | .92 |
| Antimony (anhydrous, coated from organic solvent) | .53 |

*Quantum yield of acetone relative to untreated Anatase (Baker) TiO$_2$ arbitrarily set as 1. Same for all Tables.

Table 2

Effect of Metal Concentration on the Desensitization of TiO$_2$

| Metal Concentration | Φ Rel. Anatase (Baker) | | | Rutile (TiPure 100) | | |
|---|---|---|---|---|---|---|
| | Co | Mn | Ce | Co | Mn | Ce |
| .1 | .50 | .30 | .53 | .106 | .003 | .02 |
| 1.0 | .062 | .014 | .049 | .016 | .0008 | .012 |
| 10.0 | .015 | <.005 | .013 | .012 | .0011 | .005 |

Table 3

Comparison of Cerous Acetate with Zinc Diethylphosphate

| Additive Salt at 16.6% by Weight on the TiO$_2$ | Φ rel. | |
|---|---|---|
| | OR450 | OR650 |
| None | .16 | .05 |
| Zinc Diethylphosphate | .09 | .03 |
| Cerous Acetate | .004 | .003 |

Table 4

| TiO$_2$ Pigment Composition | Φ rel. |
|---|---|
| Baker Reagent | 1.0 |
| Degussa P-25 | .85 |
| Degussa P-25 + 16.6% Zinc Diethylphosphate | .50 |
| Degussa P-25 + 16.6% Cerous Acetate | .01 |

Table 5

Stability of Cellulose Acetate Yarn Containing TiO$_2$

| Yarn Composition | Irradiation Time to 50% Loss in Initial Elongation, in Hours |
|---|---|
| Cellulose acetate | 770 |
| Cellulose acetate + 1.2% Unitane OR-450 | 950 |
| Cellulose acetate + 1.2% Unitane OR-650 | 1300 |
| Cellulose acetate + 1.2% TiPure 33 | 500 |
| Cellulose acetate + 1.2% TiO$_2$ (Unitane OR-450) treated with 0.6% cerous acetate | >2500 |
| Cellulose acetate + 1.2% TiO$_2$ (Unitane OR-650) treated with 0.6% cerous acetate | 1450 |
| Cellulose acetate + 1.2% TiO$_2$ (TiPure 33) treated with 16.6% cerous acetate | 1800 |

The invention has been described in detail with particular reference to certain preferred embodiments thereof, but it will be understood that variations and modifications can be effected within the spirit and scope of the invention.

We claim:

1. Titanium dioxide pigment having coated thereon a salt of the formula $(R-CO_2)_2Me$ where Me is $Ce^{+2}$, $Mn^{+2}$ or $Co^{+2}$ and R is a linear or branched alkyl group having from 1 to 12 carbons, at a concentration to give from about 0.1% to about 20.0% by weight of the metal based on the weight of the pigment.

2. Titanium dioxide pigment having coated thereon the acetate salt of manganese, cobalt or cerium at a concentration to give from about 0.1% to about 20.0% by weight of the metal based on the weight of the pigment.

3. Polymeric material containing TiO$_2$ pigment having coated thereon sufficient acetate salt of manganese, cobalt, or cerium to give from about 0.1% to about 20.0% by weight of the metal based on the weight of the pigment.

4. Cellulose acetate containing from about 0.01 to about 5.0% by weight of the treated TiO$_2$ of claim 1.

5. Cellulose acetate yarn containing from about 0.01 to about 5.0% by weight of the treated TiO$_2$ of claim 1.

* * * * *

UNITED STATES PATENT OFFICE
CERTIFICATE OF CORRECTION

Patent No. 4,022,632    Dated May 10, 1977

Inventor(s) Gordon C. Newland, et al

It is certified that error appears in the above-identified patent and that said Letters Patent are hereby corrected as shown below:

Column 1, line 36, "$Ce^{+2}$" should read --- $Ce^{+3}$ ---.

Column 4, line 29, "$Ce^{+2}$" should read --- $Ce^{+3}$ ---.

Signed and Sealed this

Second Day of May 1978

[SEAL]

Attest:

RUTH C. MASON
Attesting Officer

LUTRELLE F. PARKER
Acting Commissioner of Patents and Trademarks